United States Patent
Kori et al.

(10) Patent No.: US 9,203,277 B2
(45) Date of Patent: Dec. 1, 2015

(54) PERMANENT MAGNET PUMP MOTOR

(71) Applicant: Hitachi, Ltd., Chiyoda-ku, Tokyo (JP)

(72) Inventors: Daisuke Kori, Hitachinaka (JP); Motonobu Iizuka, Hitachi (JP); Atsushi Fukunaga, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 331 days.

(21) Appl. No.: 13/770,078

(22) Filed: Feb. 19, 2013

(65) Prior Publication Data

US 2013/0221780 A1 Aug. 29, 2013

(30) Foreign Application Priority Data

Feb. 27, 2012 (JP) ................. 2012-039520

(51) Int. Cl.
| | |
|---|---|
| *H02K 5/16* | (2006.01) |
| *H02K 7/08* | (2006.01) |
| *H02K 5/173* | (2006.01) |
| *H02K 15/03* | (2006.01) |

(52) U.S. Cl.
CPC .............. *H02K 5/161* (2013.01); *H02K 5/1737* (2013.01); *H02K 7/083* (2013.01); *H02K 15/03* (2013.01)

(58) Field of Classification Search
CPC ..... H02K 15/03; H02K 5/161; H02K 5/1737; H02K 7/083
USPC .................................................. 310/89, 90
See application file for complete search history.

(56) References Cited

U.S. PATENT DOCUMENTS

| | | | | |
|---|---|---|---|---|
| 4,502,504 | A | * | 3/1985 | Okada et al. .................. 137/544 |
| 4,750,371 | A | * | 6/1988 | Kobayashi et al. ...... 73/862.336 |
| 4,759,186 | A | * | 7/1988 | Sugden ............................ 60/473 |
| 5,789,837 | A | * | 8/1998 | Shin et al. ..................... 310/90.5 |
| 5,810,570 | A | * | 9/1998 | Nguyen ......................... 417/505 |
| 6,039,827 | A | * | 3/2000 | Cramer ......................... 156/173 |
| 6,246,139 | B1 | * | 6/2001 | Iwaki et al. ..................... 310/90 |
| 6,558,139 | B2 | * | 5/2003 | Nguyen et al. ................ 417/420 |
| 6,663,350 | B2 | * | 12/2003 | Tyree, Jr. ........................ 417/53 |
| 7,063,512 | B2 | | 6/2006 | Haesloop et al. |
| 7,406,830 | B2 | * | 8/2008 | Valentian et al. .............. 62/50.2 |
| 2010/0089574 | A1 | * | 4/2010 | Wideman et al. .......... 166/272.1 |
| 2010/0307614 | A1 | * | 12/2010 | Basaglia et al. .............. 137/544 |
| 2011/0210556 | A1 | * | 9/2011 | Madison ......................... 290/52 |
| 2013/0026862 | A1 | * | 1/2013 | Brandau et al. ................. 310/43 |

FOREIGN PATENT DOCUMENTS

| | | | | |
|---|---|---|---|---|
| DE | 102008060262 | A1 * | 6/2010 | ............. H02K 11/00 |
| JP | 2002-44926 | A | 2/2002 | |
| JP | 2003-337051 | A | 11/2003 | |

(Continued)

OTHER PUBLICATIONS

Translation of foreign document JP 2008172887 (Year 2008).*

(Continued)

*Primary Examiner* — Alex W Mok
(74) *Attorney, Agent, or Firm* — Crowell & Moring LLP

(57) ABSTRACT

In a permanent magnet pump motor comprising a stator and a rotor, a permanent magnet is used for the rotor; and the rotor has a shaft end portion to be mounted with a joint shaft for rotor insertion and bearing brackets for housing therein bearings for supporting the both ends of the rotor. The bearing brackets have cavities through which a rotor shaft and the joint shaft can pass.

8 Claims, 14 Drawing Sheets

(56) References Cited

FOREIGN PATENT DOCUMENTS

| | | |
|---|---|---|
| JP | 2005-312241 A | 11/2005 |
| JP | 2006-519328 A | 8/2006 |
| JP | 2006-316628 A | 11/2006 |
| JP | 2008-172887 A | 7/2008 |
| JP | 2009-148035 A | 7/2009 |
| JP | 2011-229236 A | 11/2011 |
| JP | 2012-39732 A | 2/2012 |

OTHER PUBLICATIONS

Translation of foreign document JP 2011229236 (Year 2011).*
Japanese Office Action dated Jul. 1, 2014 with English translation (eight pages).

* cited by examiner

PERMANENT MAGNET PUMP MOTOR

BACKGROUND OF THE INVENTION

1. Field of the Invention

The present invention relates to a permanent magnet pump motor having a permanent magnet rotating electric machine that includes a rotor and a stator, and a permanent magnet pump motor system incorporating the same.

2. Description of the Related Art

Widespread dissemination of permanent magnets and inverters that offer enhanced performance in recent years has prompted momentum toward incorporation of permanent magnet rotating electric machines that can achieve reduction in size and greater efficiency. A need also exists for variable speeds of motors in order to reduce environmental load.

Against this background, with a view to application to LNG pump motors, motors that incorporate permanent magnets are being developed from existing induction motors. The rotor in a permanent magnet rotating electric machine is magnetized at all times and, particularly when the rotor is to be inserted in the stator, a measure needs to be taken for considering a magnetic attractive force. Various forms of structures and devices are being studied in order to insert the rotor into the stator or separate the rotor from the stator.

SUMMARY OF THE INVENTION

Unlike ordinary pump systems, the LNG pump motor has an integrated structure in which a rotor, a stator, an impeller, and a diffuser are built into a pump casing. Since the permanent magnet rotating electric machine includes a rotor formed of a permanent magnet, a magnetic attractive force acts around the rotor at all times, which hampers insertion of the rotor into the pump casing. It is therefore difficult to assemble the rotor using the same method as that used for the existing induction motor. During the assembly, the rotor is inserted while the rotor is fixed radially to thereby prevent it from moving. The pump structure therefore needs to allow, for example, an insertion jig or tooling to be mounted in consideration of the step for fixing the rotor in position during the assembly.

JP-2003-337051-A discloses an invention that relates to a pusher apparatus disposed downwardly of an internal pump with a submerged motor removed from its casing, the pusher apparatus having a removable joint shaft. The object of the invention is to enable a stick phenomenon to be canceled without allowing a propeller or similar part to be damaged. The invention is applicable to a motor demounted from its casing and it is impossible to mount the joint shaft with the motor disposed in the casing. The structure also defies insertion of a magnetized rotor into the stator.

JP-2006-519328-A discloses an invention that relates to a pump shaft support structure in a pump. The pump shaft support structure reduces load on a bearing that supports a pump shaft, the load arising from an upward force acting on the pump shaft while the pump is not in use. In this pump shaft support structure, an axial movement of the pump shaft is restricted by the pump shaft support structure portion, and not by the bearing. When a rotor is to be removed from a stator in a permanent magnet pump motor to which JP-2006-519328-A is applied, the pump shaft support structure needs to be removed. At this time, as described above, the rotor can move axially as soon as the pump shaft support structure is removed. The rotor, having a permanent magnet disposed therein, can be moved by the acting magnetic attractive force. Understandably, the same phenomenon occurs also during assembly for lack of restrictions in the axial direction. Restrictions of the rotor by the magnetic attractive force are thus absolutely necessary for the permanent magnet motor and the application of the technique disclosed in JP-2006-519328-A is not practicable.

JP-2005-312241-A discloses a method of assembling a motor, in which a jig for holding the rotor is connected to the shaft. The method is concerned only with the jig and the inserting method and, in practice, a structure suitable for assembling needs to be provided on the housing side. The bracket for disposing the bearing, in particular, is disposed only on one side and the method does not care about the opposite side. In addition, though JP-2005-312241-A describes that whichever part, the stator or the rotor, may first be fixed to the housing, this assembly sequence is applicable to a small-sized motor operating at low speed as noted therein. The LNG pump motor delivers an output on the order of several megawatts and a speed of up to about 7000 $min^{-1}$, making the same categorized in a medium-to-large-sized class operating at high speeds among other rotating machines. Thus, the application of the method disclosed in JP-2005-312241-A is not practicable, either.

An aspect of the present invention provides a pump motor including a stator and a rotor, as a structure for a permanent magnet rotating electric machine that achieves both assemblability and maintainability, wherein a permanent magnet is used for the rotor; and the rotor has a shaft end portion adapted to be mounted with a joint shaft for rotor insertion and bearing brackets for housing therein bearings for supporting the both ends of the rotor, the bearing brackets having cavities through which a rotor shaft and the joint shaft can pass.

The present invention can enhance ease of assembly and maintainability.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

Figure 1:
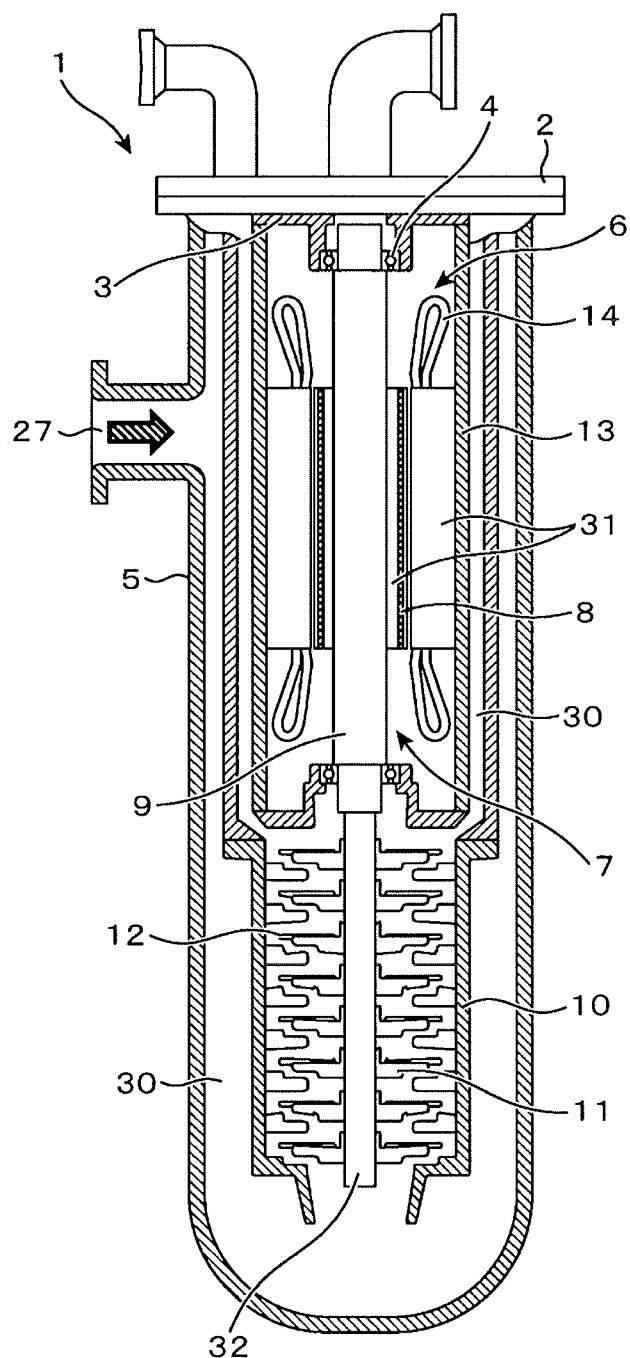
FIG. 1 is a diagram illustrating a permanent magnet pump motor according to a first embodiment of the present invention.

Preferred embodiments of the present invention will be described in detail below with reference to the accompanying drawings, wherein like reference numerals refer to like parts throughout.

First Embodiment

FIG. 1 is a cross-sectional view showing a permanent magnet pump motor according to a first embodiment of the present invention.

The permanent magnet pump is applied to an LNG plant delivering power on the order of several megawatts. Three-phase alternating current power is supplied from an inverter 25 to the permanent magnet pump motor that operates at a speed in a range from 500 to 7000 min$^{-1}$. As shown in FIG. 1, a motor portion is disposed inside the pump and the pump is operated in a vertical position with LNG at about −162° C. packed therein.

A permanent magnet pump motor 1 is covered in an outermost case called a pot 5 and a head cover 2 for hermetically sealing components disposed inside the pot 5. A stage case 10 is disposed inside the pot 5. A flow path 30 through which LNG 27 flows is disposed between the pot 5 and the stage case 10. An impeller 11, a diffuser 12, and a motor case 13 that assume major pump components are disposed inside the stage case 10. The flow path 30 through which the LNG 27 flows is similarly formed between the stage case 10 and the motor case 13. A stator 6 including an electrical steel sheet 31 to which a coil 14 is applied is fixed to, and disposed inside, the motor case 13. Similarly to the stator 6, a rotor 7 includes an electrical steel sheet 31 in which a permanent magnet 8 is disposed and to which a shaft A 9 is fastened. A neodymium magnet is used for the permanent magnet 8. Alternatively, a praseodymium magnet that offers a good magnetic property at low temperatures, such as with the LNG, may be used. SUS630 that has undergone a subzero treatment is used for the shaft A 9 that is used at extremely low temperatures (−162° C.). A shaft B 32 to which the impeller 11 and the diffuser 12 are fastened is connected to an end portion of the shaft A 9.

Figure 2:
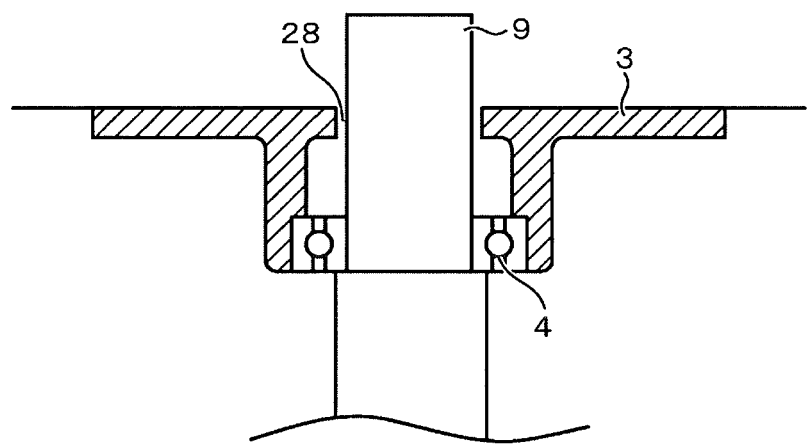
FIG. 2 is a diagram illustrating the permanent magnet pump motor according to the first embodiment of the present invention.
Figure 3:
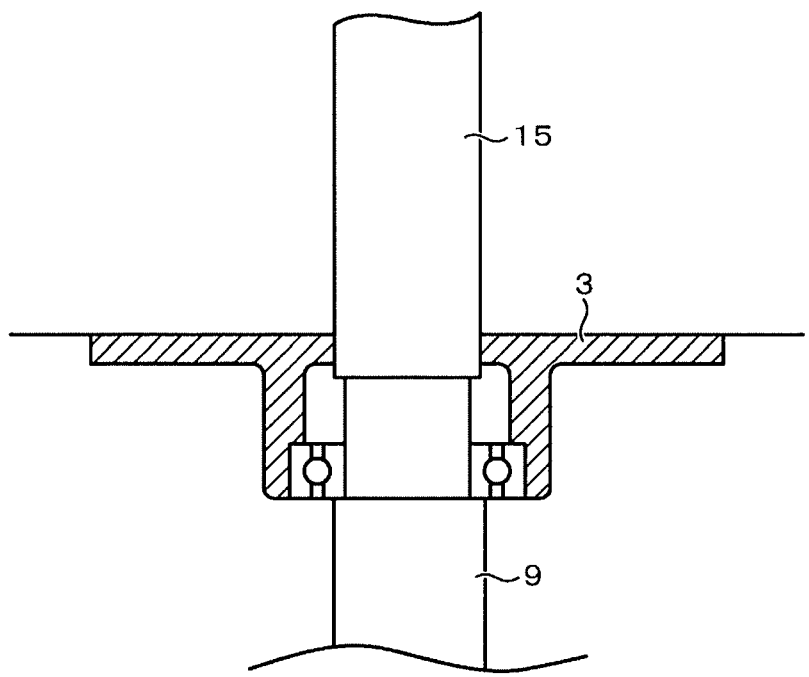
FIG. 3 is a diagram illustrating the permanent magnet pump motor according to the first embodiment of the present invention.

Bearing brackets 3 are disposed on both ends in the axial direction of the motor case 13. The rotor 7 is supported by the bearing brackets 3 and bearings 4 disposed in the bearing brackets 3. The first embodiment of the present invention is characterized in that the bearing brackets 3 that support the rotor 7 has cavities 28 penetrating therethrough. FIG. 2 is an enlarged view showing parts around the bearing bracket 3. Referring to FIG. 2, the bearing 4 is disposed in the bearing bracket 3. The bearing bracket 3 has the cavity 28 formed therein through which the shaft A 9 can pass. Being disposed at an upper portion of the pump motor and hermetically sealing the LNG 27, the bearing bracket 3 does not originally require the cavity 28. The cavity 28 is, however, required for performing assembly and maintenance processes within a short period of time and efficiently. With the permanent magnet motor, in particular, a magnetic attractive force acts on the rotor 7, which requires that the rotor 7 be inserted in the stator 6 with the magnetic attractive force prevented from acting on the rotor 7. Therefore, referring to FIG. 3, the rotor 7 is required to have an extended overall length by connecting a joint shaft 15 to the shaft A 9 fastened to the rotor 7. The cavity 28 formed in bearing bracket 3 therefore allows the rotor 7 in which the permanent magnet 8 is disposed to be inserted into, or removed from, the stator 6. Preferably, referring to FIG. 2, the cavity 28 is formed to have a diameter larger than a diameter of the bearing 4. This allows the joint shaft 15 having a diameter larger than a diameter at a leading end of the shaft A 9 to be connected as shown in FIG. 3. Connecting the joint shaft 15 extends the overall length of the rotor 7, which causes the rotor 7 to warp. Thickening the diameter of the joint shaft 15 increases stiffness, so that the rotor 7 can be prevented from warping. In addition, the bearing bracket 3 is shouldered at its portion at which the bearing 4 is disposed, thereby preventing the bearing 4 from moving axially. This allows a disassembly jig, such as the joint shaft 15, to be mounted on the rotor 7 in a steady state during a disassembly process.

In a second preferred embodiment of the present invention, an example of inserting the rotor 7 using the joint shaft 15 will be described.

Second Embodiment

Figure 4:
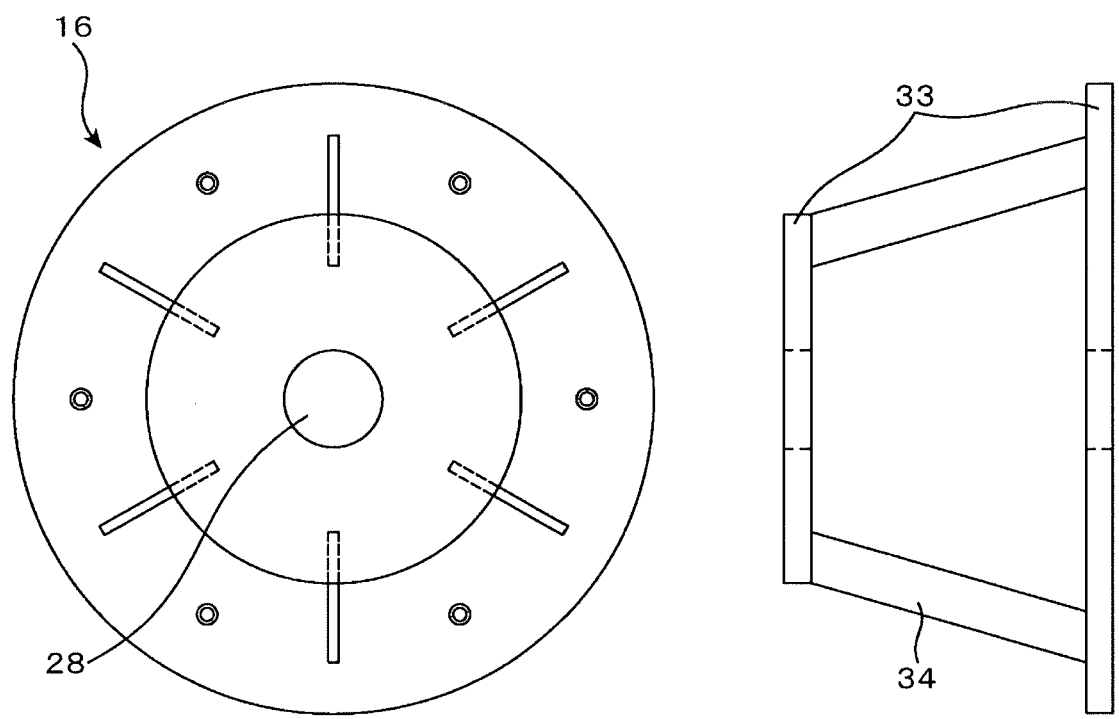
FIG. 4 is an illustration showing a jig for inserting a rotor in the permanent magnet pump motor according to a second embodiment of the present invention.
Figure 5:
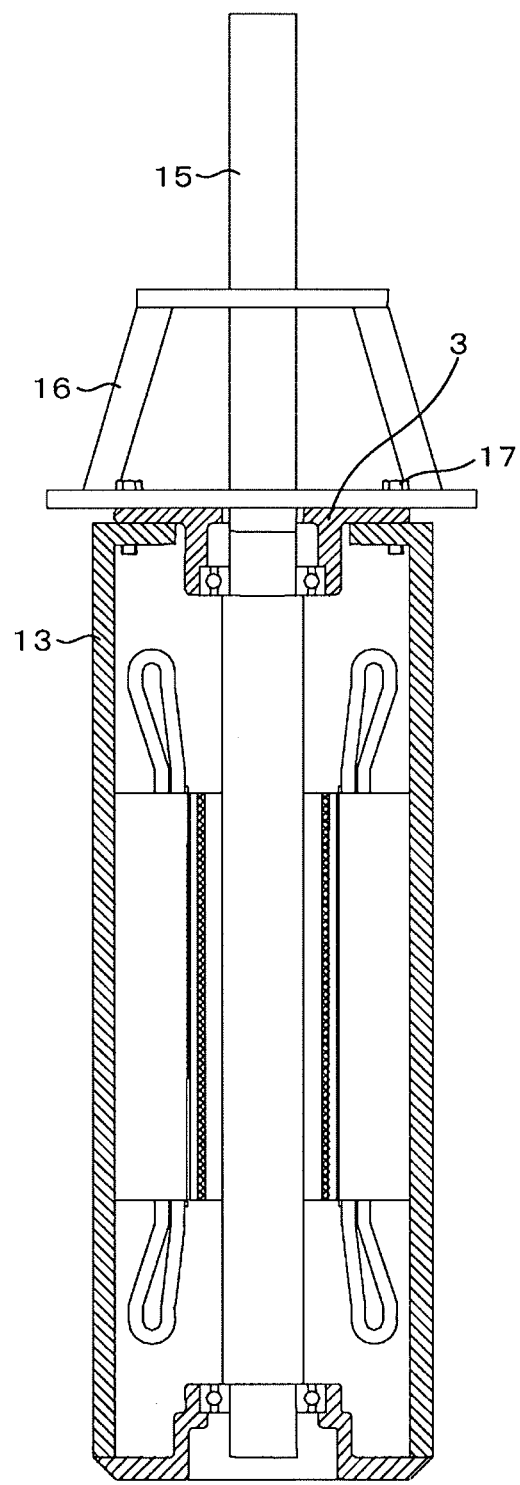
FIG. 5 is a diagram illustrating a method of mounting the jig for inserting the rotor in the permanent magnet pump motor according to the second embodiment of the present invention.

FIGS. 4 and 5 are diagrams showing an insertion jig mounted on the motor case 13 according to the second embodiment of the present invention. FIG. 4 shows a jig A 16 for inserting the rotor 7.

Referring to FIG. 4, the jig A 16 has a structure in which a plurality of columns 34 is disposed between two steel plates 33 so as to form a space therebetween and the steel plates 33 have the cavities 28 at a center thereof so as to allow the joint shaft 15 to pass therethrough. The space available between the two steel plates 33 offers a working space for, for example, tightening bolts for mounting the jig A 16 on the motor case 13.

FIG. 5 shows where the jig A 16 is mounted on the motor case 13. Referring to FIG. 5, the jig A 16 is fastened to the motor case 13 with bolts 17. In this manner, having the cavity 28 formed in the bearing bracket 3 and making the joint shaft 15 penetrate through the jig A 16 limit the magnetic attractive force acting radially to thereby move the rotor 7 in the axial direction. The rotor 7 can thereby be inserted in, or removed from, the stator 6. It is here noted that the joint shaft 15 needs to have a length equal to, or more than, the overall length of the motor case 13. For example, if the joint shaft 15 is too short, the rotor 7 and the stator 6 are in a condition of being close to each other to thereby allow the attractive force to act before the joint shaft 15 is passed through the jig A 16. Having the joint shaft 15 arranged to have a length equal to, or more than, the overall length of the motor case 13 enables the jig A 16 to hold the joint shaft 15 before the attractive force acts between the rotor 7 and the stator 6, so that the rotor 7 can be inserted in, or removed from, the stator 6 steadily.

In addition, preferably, the cavity 28 formed in the center of the jig A 16 achieves accuracy that can eliminate a fit clearance relative to the joint shaft 15 as much as feasible. This prevents the rotor 7 from being moved radially by the magnetic attractive force, thus achieving even more steady insertion and removal.

Third Embodiment

Figure 6:
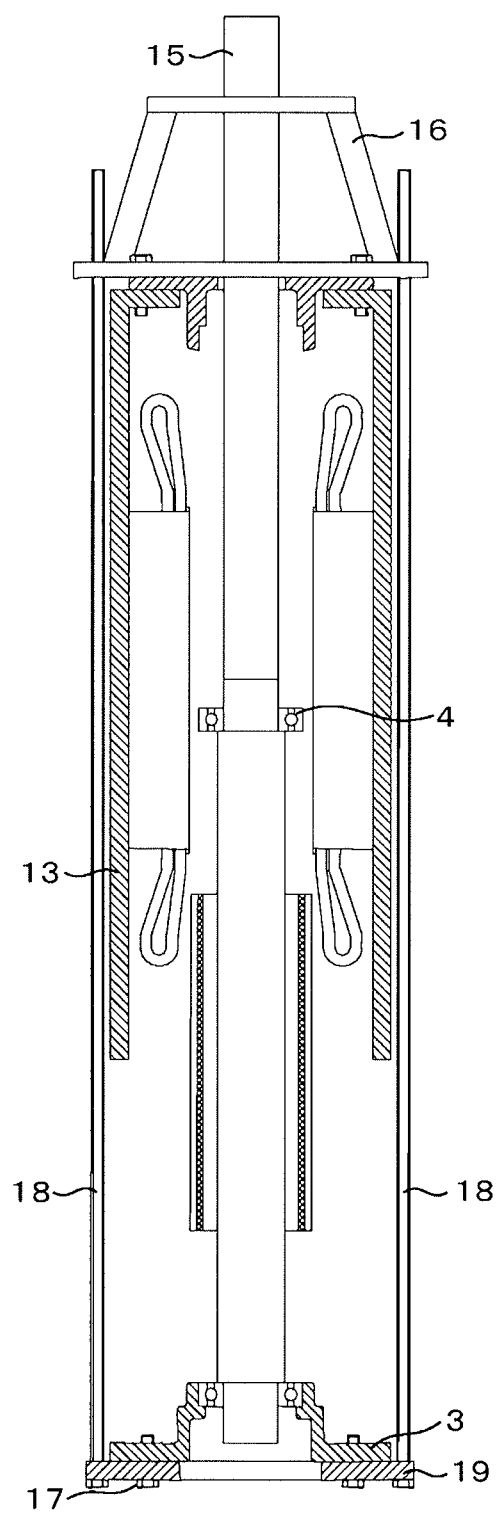
FIG. 6 is a diagram illustrating a method of mounting a jig for inserting the rotor in the permanent magnet pump motor according to a third embodiment of the present invention.
Figure 7:
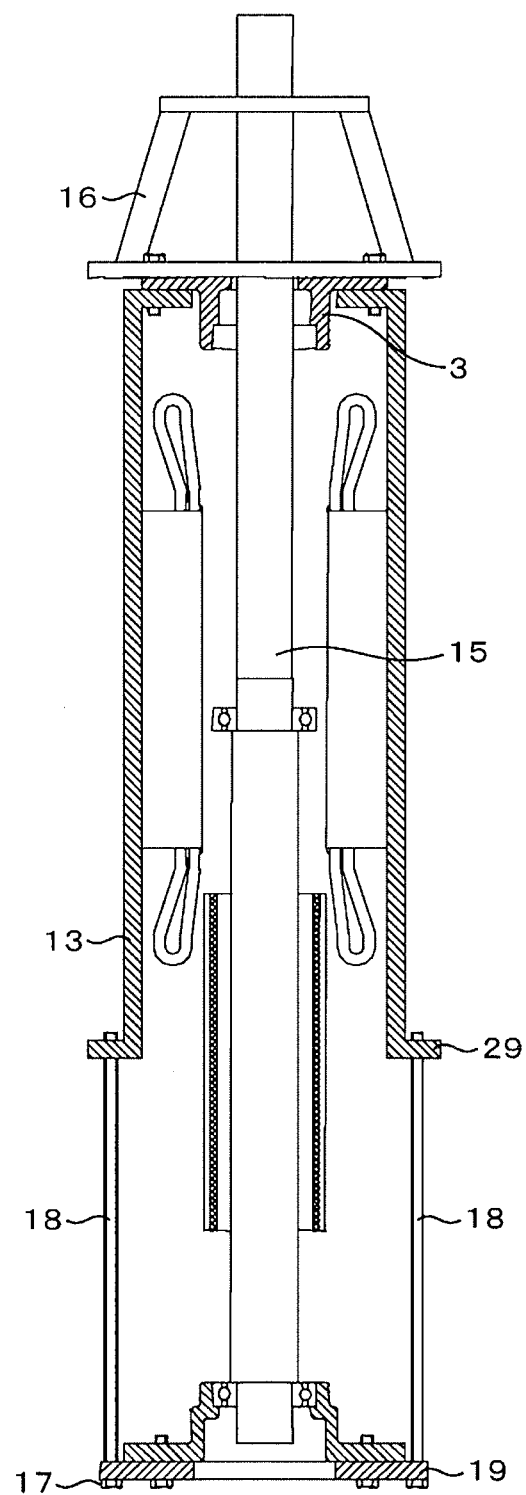
FIG. 7 is a diagram illustrating a method of mounting another jig for inserting the rotor in the permanent magnet pump motor according to the third embodiment of the present invention.

FIGS. 6 and 7 are illustrations showing support bolts mounted in the motor case 13.

Referring to FIG. 6, the jig A 16 is mounted on a first end portion of the motor case 13 and a jig B 19 is fastened to the bearing bracket 3 on a side opposite to the jig A 16 using the bolts 17. In addition, a plurality of support bolts 18 is passed through radial end portions of the jig B 19 and the jig A 16 mounted on the first end portion of the motor case 13 is connected with the support bolts 18. This allows the both ends to be supported at positions at which the magnetic attractive force of the rotor 7 does not act on the stator 6. The support bolts 18 also limit radial and axial movements. Referring to FIG. 6, as the rotor 7 is inserted into the stator 6, a magnetic attractive force is produced to jerk the rotor 7 into the stator 6; however, the support bolts 18 can hold the rotor 7 in place to counteract this magnetic attractive force. When the rotor 7 is to be inserted, the support bolts 18 simply need to be turned, which allows the rotor 7 to be inserted in the stator 6 little by little, so that safety can be ensured during the insertion process.

Referring to FIG. 7, the motor case 13 has a flange 29 formed on a second end. This shortens the length of the support bolts 18 for easier handling. The shorter support bolts 18 are less likely to warp so as to be more easily inserted. The third embodiment of the present invention illustrates an exemplary insertion process of the rotor 7. To remove the rotor 7, the insertion process is to be reversed.

Fourth Embodiment

Figure 8:
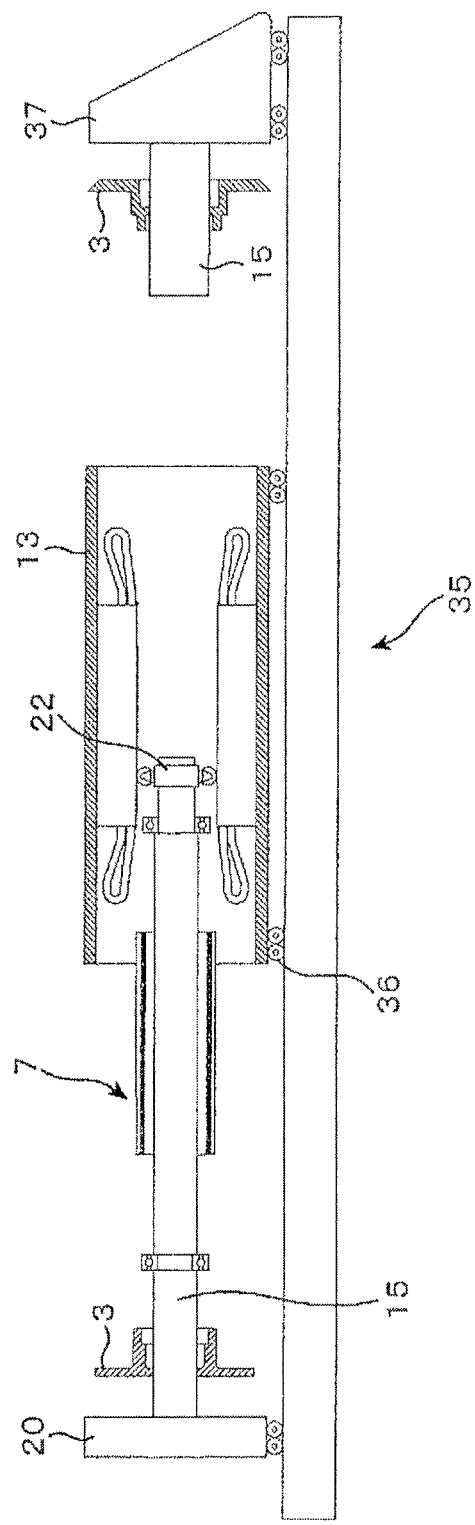
FIG. 8 is an illustration showing a method of assembling the permanent magnet pump motor according to a fourth embodiment of the present invention.
Figure 9:
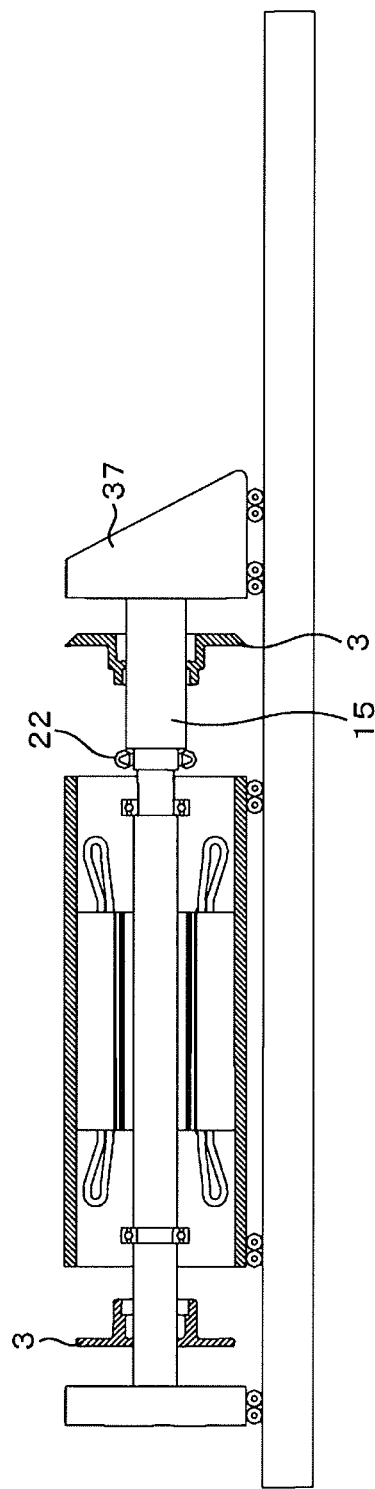
FIG. 9 is an illustration showing the method of assembling the permanent magnet pump motor according to the fourth embodiment of the present invention.
Figure 10:
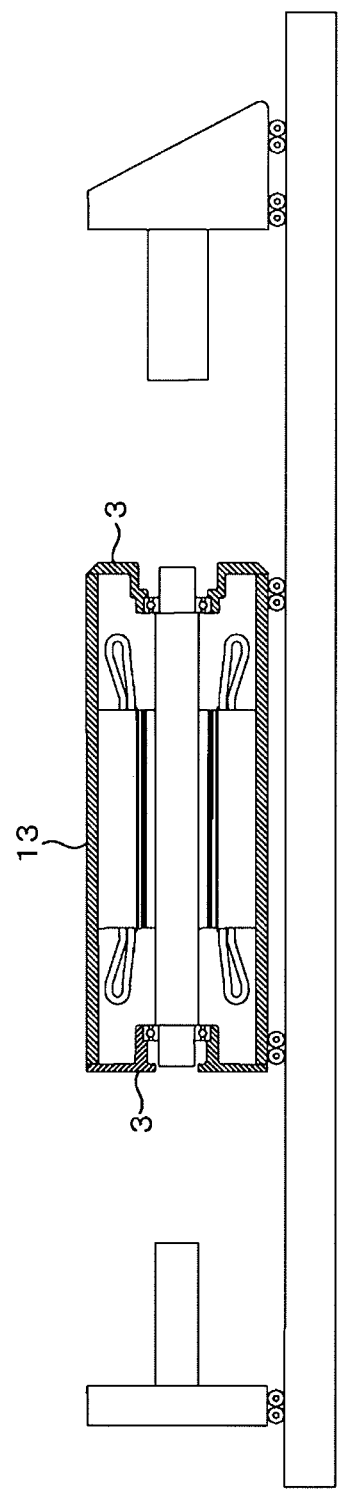
FIG. 10 is an illustration showing the method of assembling the permanent magnet pump motor according to the fourth embodiment of the present invention.

FIGS. 8, 9, and 10 are illustrations showing the rotor 7 being inserted using an insertion device 35 according to a fourth embodiment of the present invention.

Referring to FIG. 8, the motor case 13 is disposed on a movable base 36. The rotor 7 is connected to the joint shaft 15 fixed to a support base 20 and the bearing bracket 3 is also disposed at the joint shaft 15. A support roller 22 is connected to an end portion of the shaft A 9 on a side opposite to the end of the rotor 7 supported by the support base 20. As shown in FIG. 8, moving the movable base 36 to the left causes the support roller 22 mounted on the rotor 7 to roll, which allows the rotor 7 to be inserted in the stator 6 without damaging the stator 6. Since the stator 6 is formed of the electrical steel sheet 31, preferably, brass, resin, or other material that is softer than the electrical steel sheet is used for the support roller 22. Additionally, the support roller 22 is adapted to be removable at any position in the shaft A 9.

Referring to FIG. 9, the rotor 7 inserted in the stator 6 is connected to the joint shaft 15 and the shaft A 9 fixed to a support base 37 as the support base 37 is moved. Finally, as shown in FIG. 10, the support roller 22 is removed and the bearing brackets 3 on both end portions are attached to the motor case 13. This completes the insertion of the rotor 7 into the stator 6. Use of such an insertion device as the insertion device 35 to enable insertion reduces the number of times a worker directly touches, for example, the rotor, thus contributing to a highly efficient insertion process and improved safety.

Fifth Embodiment

Figure 11:
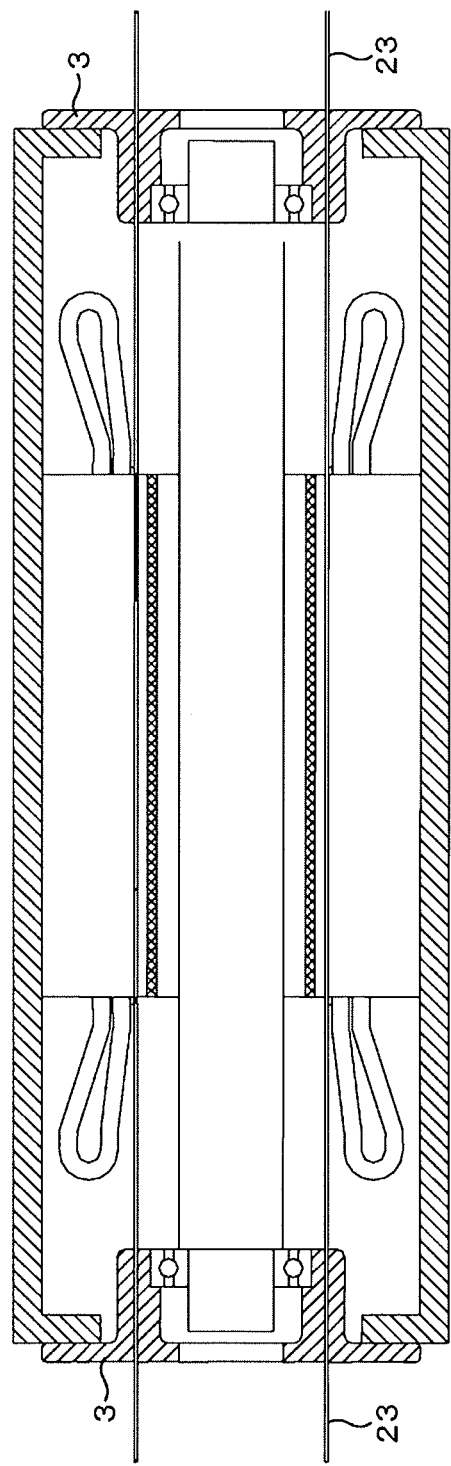
FIG. 11 is an illustration showing a method of assembling the permanent magnet pump motor according to a fifth embodiment of the present invention.
Figure 12:
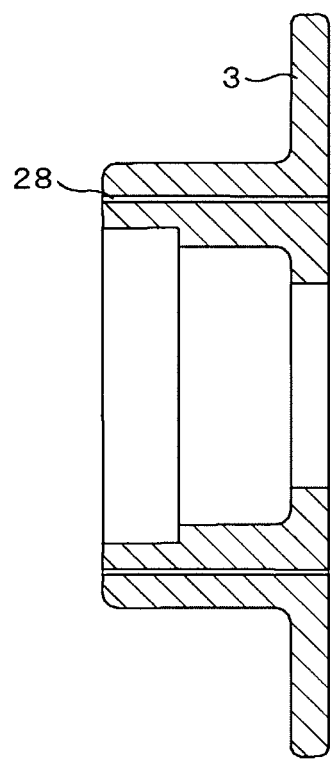
FIG. 12 is an illustration showing the method of assembling the permanent magnet pump motor according to the fifth embodiment of the present invention.

FIGS. 11 and 12 are illustrations showing a spacer formed of a nonmagnetic material 23 inserted according to a fifth embodiment of the present invention.

As shown in FIG. 11, the bearing bracket 3 is formed so as to allow the nonmagnetic material spacer 23 to be passed therethrough. FIG. 12 is an enlarged view showing the bearing bracket 3. The bearing bracket 3 has a cavity 28 formed in a side surface thereof and the nonmagnetic material spacer 23 is passed through the cavity 28. The nonmagnetic material spacer 23 is inserted in a gap between the rotor 7 and the stator 6. This prevents the rotor 7 and the stator 6 from directly contacting each other. This makes insertion of the rotor 7 into the stator 6 and removal of the rotor 7 from the stator 6 steady, so that both can be less likely to be deformed or damaged.

Sixth Embodiment

Figure 13:
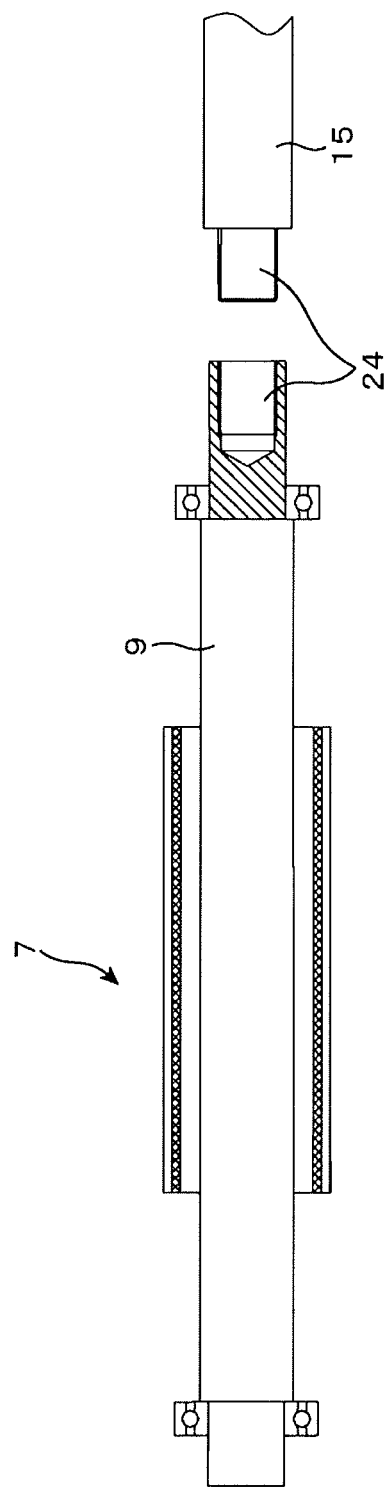
FIG. 13 is an illustration showing a method of connecting a shaft in the permanent magnet pump motor according to a sixth embodiment of the present invention.

FIG. 13 is an illustration showing a method of connecting the shaft A 9 to the joint shaft 15 according to a sixth embodiment of the present invention.

Referring to FIG. 13, an end portion of the shaft A 9 and an end portion of the joint shaft 15 are threaded to form threaded portions 24 to make a connection therebetween. The shaft A 9 and the joint shaft 15 can thereby be connected easily to thereby shorten time required for assembly and maintenance. It is noted that all of three-phase cable terminals for connecting the permanent magnet pump motor 1 to the inverter 25 are closed to thereby prevent the rotor 7 from rotating. This facilitates connection between the shaft A 9 and the joint shaft 15 through the screw.

Seventh Embodiment

Figure 14:
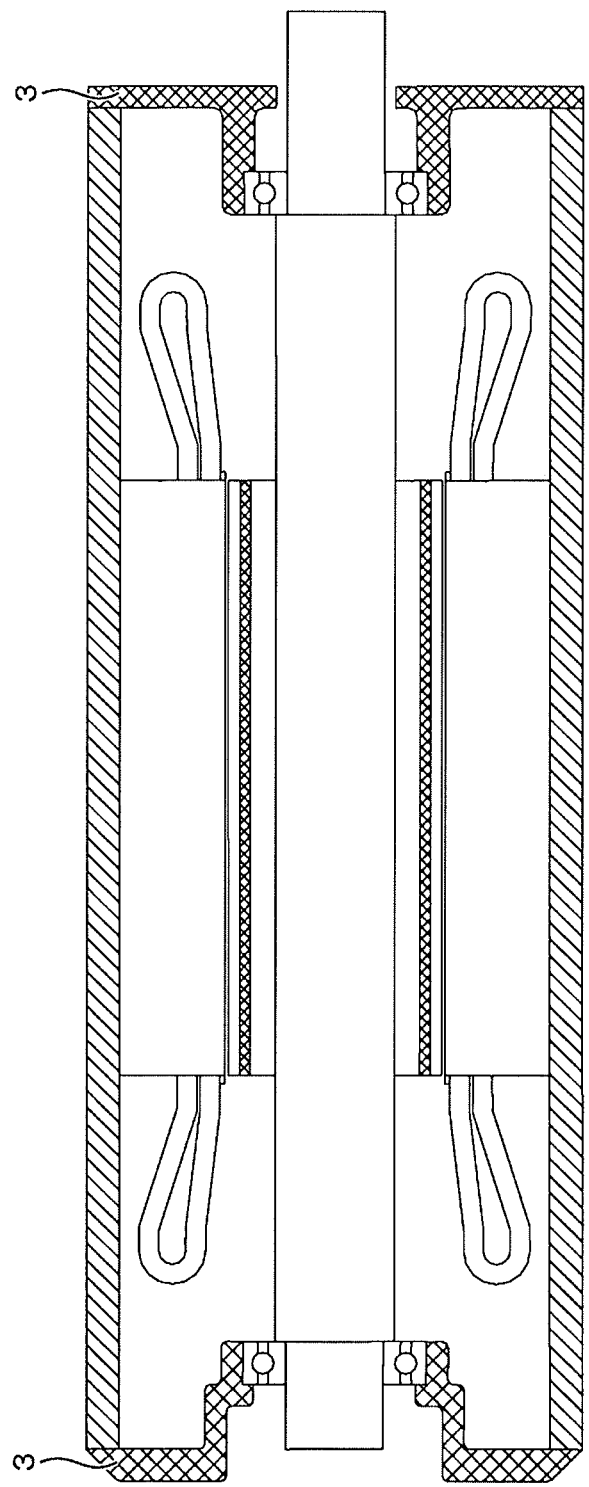
FIG. 14 is an illustration showing the method of assembling the permanent magnet pump motor in which a nonmagnetic material is used for a bearing bracket according to a seventh embodiment of the present invention.

FIG. 14 shows the bearing bracket 3 for which a nonmagnetic material is used according to a seventh embodiment of the present invention.

Referring to FIG. 14, if SUS630 is used for the shaft A 9, a magnetic flux from the rotor 7 flows to the shaft A 9 because SUS630 is a ferromagnet. A magnetic attractive force therefore acts on the bearing bracket 3 during assembly. Use of a nonmagnetic material for the bearing bracket 3 thus prevents effect from the magnetic attractive force, so that assemblability can be improved.

Eighth Embodiment

Figure 15:
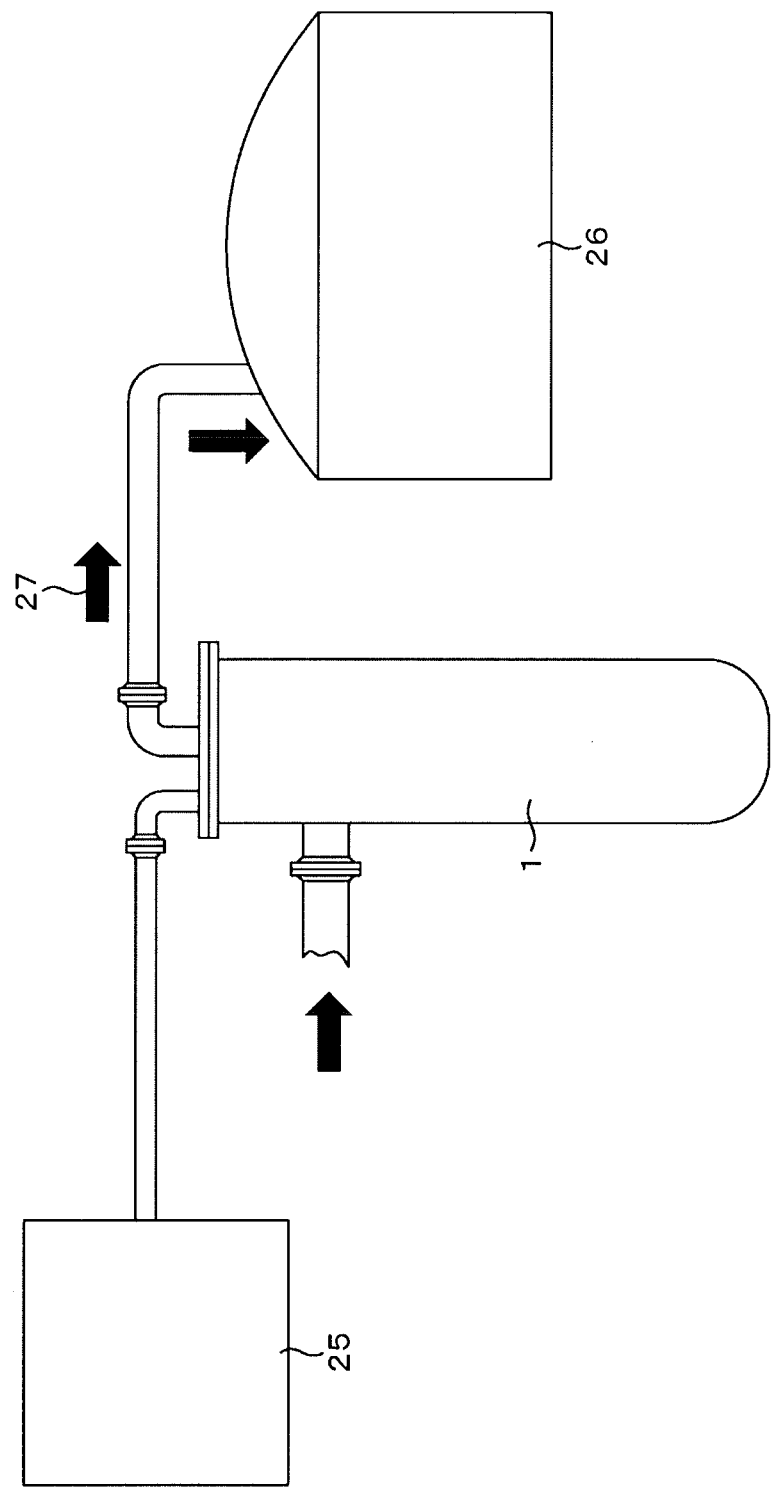
FIG. 15 is a diagram showing an exemplary LNG plant system to which the permanent magnet pump motor according to the embodiments of the present invention is applied, representing an eighth embodiment of the present invention.

FIG. 15 shows an exemplary LNG plant to which the permanent magnet pump motor 1 according to the embodiments of the present invention is applied.

The LNG plant includes a permanent magnet pump motor 1 embodied according to the first to seventh embodiments of the present invention, the inverter 25, and an LNG storage tank 26. The permanent magnet pump motor 1 is driven t thereby feed the LNG 27 to the LNG storage tank 26. The inverter 25 supplies the permanent magnet pump motor 1 with three-phase power to thereby operate the permanent magnet pump motor 1 at variable speeds. The present invention is also applicable to a ground plant or an ocean vessel. In addition, the permanent magnet pump motor can also be used as a generator.

What is claimed is:

1. A permanent magnet pump motor comprising:
   a stator;
   a motor case; and
   a rotor, wherein
   a permanent magnet is used for the rotor;
   the rotor has a shaft with an end portion to be mounted with a joint shaft for rotor insertion and bearing brackets for housing therein bearings for supporting the both ends of the rotor, the bearing brackets having cavities through which a rotor shaft and the joint shaft can pass; and
   the motor case has an end portion to be mounted with a jig for supporting the joint shaft for rotor insertion, the jig comprising:
   two steel plates; and
   a plurality of columns disposed between the two steel plates so as to form a space therebetween, the steel plates having cavities at a center thereof so as to allow the joint shaft to pass therethrough.

2. The permanent magnet pump motor according to claim 1, wherein:
   the end portion of the motor case is mounted with a support bolt for rotor insertion.

3. The permanent magnet pump motor according to claim 2, wherein:
   the end portion of the motor case is a flanged end portion.

4. The permanent magnet pump motor according to claim 1, wherein:
   at least one of the bearing brackets has a cavity formed in a position corresponding to an air gap between the rotor and the stator disposed inside the motor case so as to allow a contact prevention member for preventing the rotor and the stator from contacting each other to be inserted therein.

5. The permanent magnet pump motor according to claim 1, wherein:
   the rotor shaft and the joint shaft have end portions that are threaded to form threaded portions to make a connection therebetween.

6. The permanent magnet pump motor according to claim 1, wherein:
   the bearing brackets are formed of a nonmagnetic material.

7. A permanent magnet pump motor system comprising:
   the permanent magnet pump motor according to claim 1 disposed on an LNG plant.

8. The permanent magnet pump motor according to claim 1, wherein:
   the end portion of the motor case is a flanged end portion.

* * * * *